June 16, 1959 H. W. FALK 2,890,479
LUBRICATED HINGE
Filed Aug. 8, 1956

INVENTOR
Harold W. Falk
BY
ATTORNEY

United States Patent Office 2,890,479
Patented June 16, 1959

2,890,479

LUBRICATED HINGE

Harold W. Falk, Minneapolis, Minn.

Application August 8, 1956, Serial No. 602,803

1 Claim. (Cl. 16—161)

This invention relates to an improvement in hinges and deals particularly with a hinge which will be more resistant to wear than hinges of other types.

Hinges are, for the most part, formed from flat sheets of metal which are blanked out to the proper shape and then are bent to provide the aligned hinge pin bearings. As the metal is bent into tubular form, the ends of the bent portions abut against the body of the hinge and leave a generally V-shaped notch which is between the ends of the bent portions and the body of the hinge plate. This leaves an interior bearing surface for the hinge pin which is not completely circular in cross section and various means have been provided for avoiding this difficulty or reducing the size of the notch to a minimum.

Difficulty is also experienced, particularly in conjunction with hinges used on doors which are almost continually used, in wearing the hinge pin bearings at the ends thereof. The weight of the door causes the ends of these bearings to rub together each time the door is opened or closed and as the two parts of the hinge are normally made of the same material, this action has a tendency to cause the hinge bearings to wear. The wearing of the hinges causes the door to move downwardly so that the door will eventually strike the sill and a crack will be provided above the door.

A feature of the present invention lies in the provision of a hinge which is constructed to avoid the difficulties previously experienced. This hinge, when completed, has hinge pin bearings which are cylindrical in form, the notches being filled with a lubricant material which greatly reduces the wear between the pin bearings.

An object of the present invention lies in the provision of a hinge having rolled or formed hinge bearings which are provided with longitudinally extending notches therein and in filling these notches with a semi-solid or solid material which acts as a lubricant for the hinge over a considerable period of time, thus reducing the wear between the hinge bearings.

As the hinge is operated, at least one portion of the hinge must rotate relative to the hinge pin. By providing a body of lubricant extending longitudinally of the hinge throughout the entire length of the bearing, the friction between the bearings and the pin is automatically reduced regardless of which plate rotates relative to the pin. The lubricant is carried by the relatively rotating part to the ends of the hinge bearings so as to also reduce friction at these points. As only an extremely small amount of lubricant is required to avoid much of the wear experienced, my structure has been found capable of materially lengthening the life of the hinges.

These and other objects and novel features of the present invention will be more clearly and fully set forth in the following specification and claims.

In the drawings forming a part of the specification:

Figure 1:
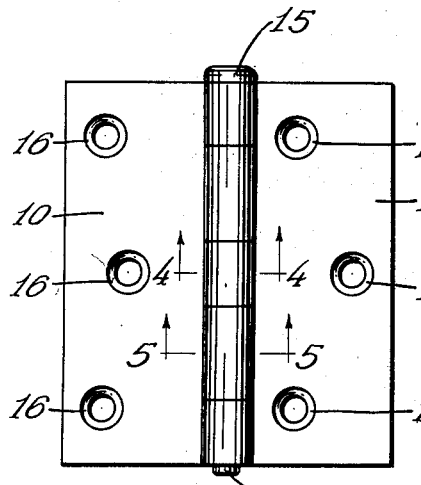
Figure 1 is a front elevational view of a hinge in open position, showing a typical construction thereof.
Figure 2:
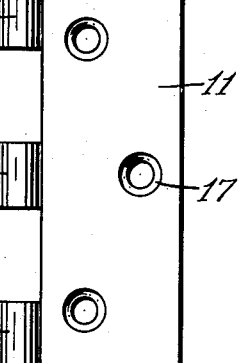
Figure 2 is an elevational view of one hinge plate.
Figure 3:
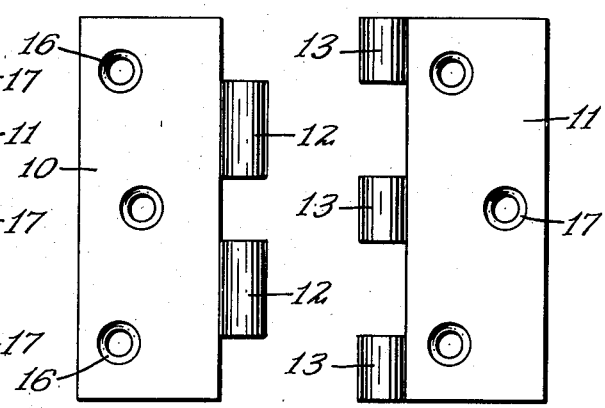
Figure 3 is an elevational view of the other hinge plate.

One of the advantages of the present construction lies in the fact that in general the hinge construction is not changed. In other words, in constructing the hinge, it is not necessary to change the dies as the improvement lies in an addition to a previous form of hinge rather than to a completely new construction.

The hinge includes a pair of hinge plates 10 and 11. The plate 10 is provided with spaced axially aligned hinge pin bearings 12. The hinge plate 11 is similarly provided with a series of spaced axially aligned hinge pin bearings 13. The bearings 12 are in staggered relation to the bearings 13 so that the two parts of the hinge may interfit together and so that the bearings 12 may be in axial alignment with the bearings 13. A hinge pin 14 having an enlarged head 15 is inserted through the bearings 12 and 13 to pivotally connect the two hinge plates.

As is usual practice, apertures 16 are provided through the hinge plate 10 and similar apertures 17 are provided in the hinge plate 11. The apertures 16 and 17 are designed to accommodate fastening screws for mounting the hinges to the desired surfaces.

It should be understood that only one type of hinge is illustrated in the drawings. This is a flush type hinge which may be secured to adjoining surfaces arranged on a common plane or which may be mounted in opposed notches in the frame and door. This construction is only for the purpose of illustration as the invention may be applied to virtually any type of hinge in which the hinge pin bearings are formed by bending spaced ears on the hinge plates into tubular form.

Figure 4:
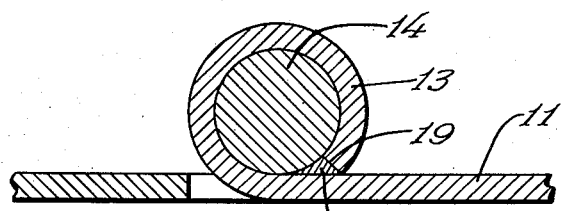
Figure 4 is a sectional view through the hinge, the position of the section being indicated by the line 4—4 of Figure 1.

During the forming operation of the hinge plates, parallel spaced ears are bent into tubular form until the ends of these ears abut against the flat portion of the hinge plate. For example, the ends of the strips or ears forming the bearings 13 are shown in Figure 4 to abut against the plate 11 in such a manner that these ear ends 19 are at an acute angle to the surface of the plate 11. This provides a generally triangular notch 20 between the ear and 19 and the adjoining part of the hinge plate. In other words, the inner surface of the hinge pin bearing is not completely cylindrical, there being a generally triangular notch extending longitudinally thereof.

Figure 5:
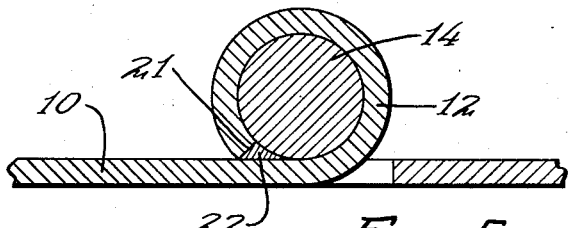
Figure 5 is a sectional view of a modified form of hinge construction, the position of the section being indicated by the line 5—5 of Figure 1.

As indicated in Figure 5 of the drawings, the ears forming the hinge pin bearings 12 are also bent until the ends 21 thereof abut against the surface of the hinge plate 10, providing a generally triangular elongated notch 22 between the end edge 21 and the adjoining part of the hinge plate. This triangular notch has always been considered undesirable as the edges of the notch have a tendency to create friction against the hinge pin and as any lubricant such as light oil used to lubricate the hinge pin is scraped from the pin by the edges of the notch and this lubricant is normally quickly drained from the hinge.

In the present invention, the generally triangular notches or grooves 20 and 22 are filled with a material which tends to lubricate the hinge pin as it rotates relative thereto. Numerous materials have been successfully used for this purpose. For example, a mixture of beeswax and powdered graphite has been used, the wax tending to hold the graphite suspended but still permitting the release of some of the graphite to the hinge pin surface. Other metals such as lead or Babbitt have been used to fill these notches or grooves and to provide a smooth inner surface. These metals also have the property of lubricating the hinge pin and of retaining lubricant so as to provide a continuing source thereof. Other lubricant materials can also be used to fill the grooves and to form a smooth continuous inner surface to the hinge pin.

Tests have shown that hinges produced in the manner described will wear materially longer than other hinges subjected to similar conditions. While the construction is extremely simple and while the added cost of the hinges is extremely small, the products will last very materially longer than hinges of common types. The invention actually consists in adding to the present hinges so that no changes in dies or in the method of production is necessary, it only being necessary to add an additional step to the formation of the hinges.

In accordance with the patent statutes, I have described the principles of construction and operation of my improvement in hinges, and while I have endeavored to set forth the best embodiment thereof, I desire to have it understood that obvious changes may be made within the scope of the following claims without departing from the spirit of my invention.

I claim:

A hinge including a pair of hinge plates having hinge ears projecting therefrom, the hinge ears being bent into tubular form and terminating with the end of each ear substantially abutting the plate to which it is attached, providing a generally triangular notch between the end of each ear and the remainder of the hinge plate, a lubricant material filling each said notch and forming, with the inner surface of the remainder of the ear, a substantially cylindrical bearing surface.

References Cited in the file of this patent

UNITED STATES PATENTS

| | | |
|---|---|---|
| 183,080 | Sweeney | Oct. 10, 1876 |
| 413,081 | Murray | Oct. 15, 1889 |
| 1,444,695 | McNeill | Feb. 6, 1923 |
| 1,941,768 | Vigne | Jan. 2, 1934 |
| 2,135,723 | McCallum | Nov. 8, 1938 |
| 2,154,860 | Morse | Apr. 18, 1939 |
| 2,228,876 | Howe | Jan. 14, 1941 |